Patented Apr. 24, 1945

2,374,213

UNITED STATES PATENT OFFICE 2,374,213

CLEANSING COMPOSITIONS

Morris Katzman, Chicago, Ill., assignor to The Emulsol Corporation, Chicago, Ill., a corporation of Illinois No Drawing. Application August 15, 1941, Serial No. 407,091

18 Claims. (Cl. 252—152)

My invention relates to cleansing compositions and is particularly concerned with the preparation of products having excellent cleansing and other desirable properties and characteristics.

In accordance with my invention, a cation-active agent is admixed or incorporated with certain materials, hereinafter mentioned, to form preferably a relatively homogeneous composition which, in the preferred form of the invention, is a solid at room temperature.

The cation-active agents which are utilized in accordance with the present invention may be selected from a large group and may be of aliphatic, carbocyclic, or heterocyclic character. Among the cation-active agents which may be employed in accordance with the present invention are the bases or their salts, such as may be derived from pentavalent nitrogen, and further the sulphonium, phosphonium and arsonium, etc. bases and their salts. The quaternary ammonium compounds are examples of such compounds, the pyridonium or pyridinium compounds being specific examples thereof. In the bases or their salts, the innocuous anions may be hydroxide, chloride, sulphate, bromide, iodide, acetate, etc. The groups inducing cation activity comprise long chain groupings such as aliphatic hydrocarbon chains having at least six and preferably from twelve to eighteen carbon atoms. The long chain groupings may be composed of two or more benzene nuclei or other cyclic radicals, either combined directly or, for example, through carbon or nitrogen or other linkages, with or without aliphatic chains substituted for the hydrogen in rings.

Specific examples of cation-active agents which may be used in accordance with my invention include octyl pyridinium iodide, dodecyl pyridinium bromide, hexadecyl pyridinium iodide, octadecyl pyridinium bromide, dodecyl pyridinium iodide, dodecyl pyridinium chloride, dodecyl-triethyl ammonium iodide, octyl-triethyl ammonium iodide, decyl-triethyl ammonium iodide, dodecyl-triethyl ammonium iodide, hexadecyl-triethyl ammonium iodide, lauryl amine hydrochloride, cetyl amine hydrochloride, heptadecyl amine hydrochloride, octa-decyl amine hydrochloride, octyl amine hydrobromide, octyl amine hydrochloride, toluene azophenyl-trimethyl ammonium iodide, benzene azophenyl-trimethyl ammonium iodide, diphenyl-azophenyl-trimethyl ammonium methylsulphate, isopropyl-naphthyl-trimethyl ammonium iodide, diethyl-dodecyl sulphonium hydroxide, triethyl-dodecyl phosphonium hydroxide, trimethyl-dodecyl phosphonium iodide, and trimethyl-dodecyl phosphonium bromide.

Various of the cation-active agents, listed hereinabove, may be represented by the general formula

wherein $R_1$ represents an aliphatic radical, such as a hydrocarbon radical, or the radical of a polyhydric alcohol linked to an alkyl or acyl group in the form of an ester or an ether, in each case said aliphatic radical containing at least eight carbon atoms, $R_2$, $R_3$, and $R_4$ are hydrogen or hydrocarbon groups which may be components of a heterocyclic ring, and X represents halogen or other anions such as $OH^-$, $HSO_4^-$, $ROS_4^-$, $C_6H_5SO_3^-$, borate, phosphate, nitrate, acetate, etc. Among the specific substances falling within this general class, some of which have been mentioned hereinabove, are cetyl trimethyl ammonium bromide or chloride, dodecyl pyridinium bromide, cetyl pyridinium iodide, lauryl trimethyl ammonium chloride or iodide, mono-oleic acid ester of diethylene glycol pyridium chloride, octadecyl pyridinium bromide, octyl pyridinium chloride, 4 dodecyl, N-methyl-quinaldinium-methylsulphate; N-ethyl triethanolamine mono-oleate-bromide, salts of high molecular weight betaine esters, etc.

Other cation-active agents which may be utilized in accordance with the teachings of the present invention are the mineral acid salts of higher molecular weight fatty acid esters of hydroxy non-tertiary amines, a representative ex-example of which is the hydrochloride of the lauric acid ester of hydroxy-ethyl amine. These compounds are disclosed in a co-pending application of Frank J. Cahn, Serial No. 364,032, filed November 11, 1940. Still another group of cation-active agents which may be utilized in the practice of the present invention are compounds of the following character.

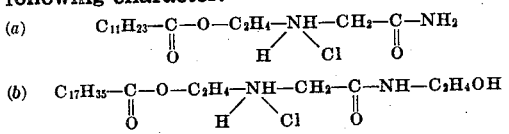

This latter group of substances is disclosed in the copending application of Albert K. Epstein and Morris Katzman, Serial No. 370,354, filed December 16, 1940.

The materials which are admixed with the cation-active agents to produce the compositions of the present invention are higher molecular weight carboxylic acid derivatives of aliphatic hydroxy compounds, said derivatives containing at least one free or unesterified hydroxy group.

One sub-class of such materials comprises higher molecular weight amides of hydroxy non-tertiary amines, particularly the higher molecular weight fatty acid amides of hydroxy-alkyl non-tertiary amines. Representative examples are the lauric acid amide or coconut oil mixed fatty acid amides of monoethanolamine or di-ethanolamine, the caprylic acid amide of mono-ethanolamine, the lauric acid amide of morpholine, the coconut oil mixed fatty acid amides of glycerol mono-amine, the myristic acid amide of di-methylol ethyl amino methane, the myristic acid amide of propanolamine, and the caprylic and capric acid amides of diethanolamine.

The hydroxy primary and secondary amines, or, in other words, hydroxy non-tertiary amines, which may be utilized in the preparation of the amides employed in accordance with the present invention include, among others, symmetrical unsymmetrical, normal and iso-derivatives, such as monoethanolamine, diethanolamine mono-propanolamine, dipropanolamine, isopropanol-amine, monobutanolamine, moniso-butanolamine, di-butanolamine, monopentaolamine, di-pentan-olamine, monohexyanolamine, dihexyanolamine, mono-octanolamine, dictanilamine, monodecyl-olamine, mono-laurylolamine, mono-hexadecyl-olamine, mono-octadecylolamine; arylolamines such as p-amino phenol and

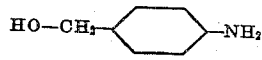

mono-ethyl, mono-ethanolamine; mono-butyl, mono-ethanol amine; monocyclohexyl, mono-ethanol amine; alkylol polyamines such as alkylol derivatives of ethyene diamine, diethylene tri-amine, and triethylene tetra-amine as, for example, hydroxy-ethyl ethylene diamine, di-glycerol mono-amine; diglycerol di-amine; hydroxy-amines derived from other polyhydric alcohols, including glycols, sugars and sugar alcohols such as ethylene glycol, diethylene glycol, dextrose, sucrose, sorbitol, mannitol and dulcitol; 1-amino-2,3-propanediol; 2-amino-1,3-propanediol; 2 - amino - 2 - methyl-1,3-propanediol; 2-amino-2-n-propyl-1,3-propanediol; 2 - amino-2-isopropyl - 1,3-propanediol; 2-amino-2-methyl-1,4-butanediol; 2-amino-2-methyl-1,5-pentanediol; 2-amino-2-ethyl-1,3-propanediol; 2-amino-2 - ethylol-1,3-propanediol; 2-amino-2-methyl-1,6 - hexanediol; and 1 - amino-1,1-dimethyl ethanol. The glycerol mono-amines and the related hydroxy amines such as various of those disclosed hereinabove may be prepared by various procedures and in different ways. Many of them are conveniently produced by nitrating paraffin hydrocarbons, substituting methylol groups for hydrogen on the carbons to which the nitro groups are attached, and then reducing the nitro groups to amine groups. Polymerized hydroxy non-tertiary amines prepared, for example, by polymerizing monoethanolamine, diethanolamine, or other hydroxy non-tertiary amines, such as those mentioned hereinabove, particularly in the presence of a catalyst such as sodium hydroxide or the like, may also be employed. The preparation of polymerized hydroxy amines is disclosed, for example, in United States Patent No. 2,178,173. Homologues and substitution derivatives of the above-mentioned hydroxy amines may also be utilized. Because of commercial and other considerations, monoethanol amine, and diethanolamine are especially desirable. It will be understood that the hydrox non-tertiary amines may be utilized in pure impure or commercial form.

The carboxylic acids, containing preferably a least eight carbon atoms, which are utilized with the aforementioned amines to form the amide: include, among others, straight chain and branched chain, saturated and unsaturated, carboxylic, aliphatic (including cycloaliphatic) fatty, aromatic, hydroaromatic, and aralphatic acids including caproic acid, caprylic acid pelargonic acid, capric acid, sebacic acid, oleic acid, ricinoleic acid, ricinielaidic acid, ricinostearolic acid, linoleic acid, linolenic acid, lauric acid, myristic acid, palmitic acid, mixtures of any two or more of the above mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oils, whale oil, shark oil and other fish oils, partially or completely hydrogenated animal and vegetable oils such as those mentioned; oxidized hydroxy and alpha-hydroxy higher carboxylic, aliphatic and fatty and/or polymerized higher fatty acids or higher fatty acids derived from oxidized and/or polymerized triglyceride oils; hydroxy acids such as alpha-hydroxy capric acid, alpha-hydroxy lauric acid, alpha-hydroxy myristic acid, alpha-hydroxy coconut oil mixed fatty acids, and the like; naphthenic and aromatic acids such as phthalic acid, benzoic acid, Twitchell fatty acids, naphthoic acid, pyridine carboxylic acid; hydroxy aromatic acids such as salicylic acid, hydroxy benzoic and naphthoic acids, and the like. It will be understood that mixtures of any two or more of said acids may be employed if desired and it will also be appreciated that said acids may contain substituent groups such as halogen, ketone and other groups. Of particular utility are the fatty acids containing from 8 to 14 carbon atoms.

The other sub-class of materials which, in accordance with my present invention, are incorported with the cation-active agents are higher molecular weight carboxylic partial esters of aliphatic polyhydroxy substances or, in other words, esters of aliphatic polyhydroxy substances containing at least one free or unesterified hydroxy group attached to the polyhydroxy nucleus. Representative materials in this sub-class are monocaprylin, dicaprylin, monolaurin, di-laurin, monomyristin, monopalmitin, monostearin, stearic acid mono-ester of diglycerol, lauric acid mono-esters of ethylene glycol and diethylene glycol. In general, this sub-class includes, among other substances, the partial esters of any of the above disclosed higher molecular weight carboxylic acids with any of the following illustrative aliphatic polyhydroxy substances: glycerol, glycols such as ethylene glycol, propylene glycol, trimethylene glycol, butylene glycol and the like; polyglycols such as diethylene glycol, triethylene glycol and tetraethylene glycol; pentaerythritol; quercitol; di-hydroxy acetone; thiethanolamine; tripropanolamine; polyglycerols such as diglycerol, triglycerol, tetraglycerol and the like including mixtures thereof; carbohydrates and sugars including mono-, di- and polysaccharides such as dextrose, sucrose, xylose, arabinose, galactose, fructose, maltose, mannose, dextrin, starch, and the like; the natural and synthetic simple and complex glucosides; sugar alcohols such as arabitol, mannitol, mannitan, sorbitol, sorbitan, and dulcitol; and polyhydroxycarboxylic acids such as tartaric acid, mucic acid, saccharic acid, gluconic acid, glucuronic acid, gulonic acid, mannonic acid, trihydroxyglutaric acid, glyceric acid, carboxylic oxidation products of polyglycerols, others of similar character, and hydroxyethyl and hydroxypropyl ether derivatives of the above, as, for example:

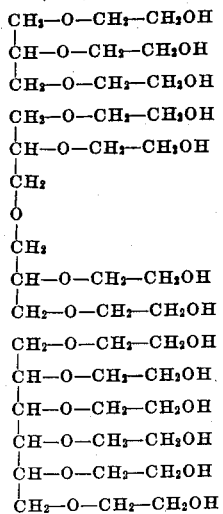

(For convenience, all hydroxyl groups are written facing one way.)

The following examples are illustrative of cleansing compositions falling within the scope of my invention but it will be understood that I do not wish to be restricted thereto as various changes may be made with respect to the combinations of different of the cation-active and other materials, the use of various fillers, changes in proportions and the like, all within the scope of my invention in the light of the guiding principles which I have disclosed herein.

*Example I*

Equal parts by weight of substantially pure monolaurin and a compound having the formula

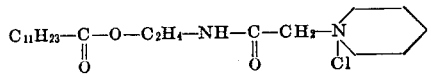

were heated together to 90 degrees C.–100 degrees C. and mixed to form a homogeneous product which, on cooling, solidified to a hard cake. The product had excellent cleansing properties.

*Example II*

Equal parts by weight of monolaurin and the lauric acid ester (or coconut oil mixed fatty acid esters) of monoethanolamine hydrochloride (produced as described in the application of Frank J. Cahn, Serial No. 364,032, filed November 11, 1940) were melted together at 90 degrees C.–100 degrees C. and mixed to form a homogeneous product which, on cooling, solidified to a nearly solid cake. The product had excellent cleansing properties.

*Example III*

Equal ports by weight of the lauric acid amides of monoethanolamine and a compound having the formula

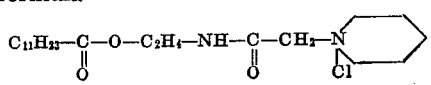

were melted together at 90 degrees C.–100 degrees C. and mixed to form a homogeneous product which, on cooling, solidified to a hard cake. The product had good foaming and cleansing properties.

*Example IV*

5 parts by weight of substantially pure monolaurin, 5 parts by weight of

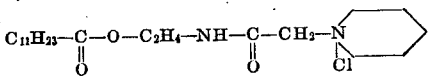

and 90 parts by weight of "Carbowax 4000" were heated to 90 degrees C.–100 degrees C. and mixed to form a homogeneous product which, on cooling, solidified to a solid cake. The product had good foaming and detergent properties.

*Example V*

Equal parts by weight of monostearin and

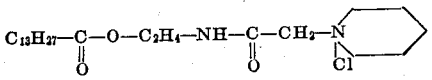

were heated to 90 degrees C.–100 degrees C. and mixed to form a homogeneous product which, on cooling, solidified to a hard cake. The product had good cleansing properties.

The proportions of the cation-active agents and other materials are subject to variation. While I prefer to employ approximately equal proportions by weight of the cation-active agents and the carboxylic acid derivatives, I may use amounts of each to the other in the ratio of one to ten or ten to one. In addition, the compositions may contain fillers, perfumes, dyes, and the like. The compositions may be made up into various shapes such as bars, ribbons, vermicilli, and the like.

What is claimed as new and desired to be protected by Letters Patent of the United States is:

1. A cleansing composition comprising a cation-active surface modifying agent admixed with a carboxylic acid derivative of an aliphatic hydroxy compound, the carboxylic acid radical of which contains at least eight carbon atoms, said derivative containing at least one unesterified hydroxy group, said ingredients being present in proportions bearing a ratio to each other of from about 1 to 10 to about 10 to 1.

2. A cleansing composition comprising a cation-active surface modifying agent admixed with a fatty acid derivative of an aliphatic hydroxy compound, the fatty acid radical of which contains at least eight carbon atoms, said derivative containing at least one unesterified hydroxy group, said ingredients being present in proportions bearing a ratio to each other of from about 1 to 10 to about 10 to 1.

3. A cleansing composition comprising a cation-active surface modifying agent and a fatty acid mono-ester of an aliphatic polyhydric alcohol, the fatty acid radical of which contains at least eight carbon atoms, said ingredients being present in proportions bearing a ratio to each other of from about 1 to 10 to about 10 to 1.

4. A cleansing composition comprising a cation-active surface modifying agent and a fatty acid mono-ester of glycerine, the fatty acid radical of which contains at least eight carbon atoms, said ingredients being present in proportions bearing a ratio to each other of from about 1 to 10 to about 10 to 1.

5. A cleansing composition comprising a cation-active surface modifying agent and an amide of a hydroxy-alkyl non-tertiary amine with a fatty acid containing from 8 to 18 carbon atoms, said ingredients being present in proportions bearing a ratio to each other of from about 1 to 10 to about 10 to 1.

6. A cleansing composition comprising a nitrogenous cation-active surface modifying agent and an amide of a hydroxy-alkyl primary amine with a fatty acid containing from 8 to 18 carbon atoms, said ingredients being present in proportions bearing a ratio to each other of from about 1 to 10 to about 10 to 1.

7. A cleansing composition comprising a cation-active quaternary ammonium compound and an amide of a hydroxy-alkyl non-tertiary amine with a fatty acid containing from 8 to 18 carbon atoms, said ingredients being present in proportions bearing a ratio to each other of from about 1 to 10 to about 10 to 1.

8. A cleansing composition comprising a nitrogenous cation-active surface modifying agent and an amide of monoethanolamine with lauric acid, said ingredients being present in proportions bearing a ratio to each other of from about 1 to 10 to about 10 to 1.

9. A cleansing composition comprising a cation-active quaternary ammonium compound corresponding to the general formula

wherein $R^1$ represents an aliphatic radical containing at least 8 carbon atoms, $R^2$, $R^3$ and $R^4$ are selected from the group consisting of hydrogen and hydrocarbon groups which may be components of a heterocyclic ring and X represents an anion, in admixture with a carboxylic acid derivative of an aliphatic hydroxy compound, the aliphatic radical of which contains at least eight carbon atoms, said derivative containing at least one free hydroxy group, said ingredients being present in proportions bearing a ratio to each other of from about 1 to 10 to about 10 to 1.

10. A cleansing composition comprising a cation-active quaternary ammonium compound corresponding to the general formula

wherein $R^1$ represents an aliphatic radical containing at least 8 carbon atoms, $R^2$, $R^3$ and $R^4$ are selected from the group consisting of hydrogen and hydrocarbon groups which may be components of a heterocyclic ring and X represents an anion, in admixture with a fatty acid monoester of an aliphatic polyhydroxy compound, the fatty acid radical of which contains at least eight carbon atoms, said ingredients being present in proportions bearing a ratio to each other of from about 1 to 10 to about 10 to 1.

11. A cleansing composition comprising a cation-active quaternary ammonium compound corresponding to the general formula

wherein $R^1$ represents an aliphatic radical containing at least 8 carbon atoms, $R^2$, $R^3$ and $R^4$ are members selected from the group consisting of hydrogen and hydrocarbon groups which may be components of a heterocyclic ring and X represents an anion, in admixture with a fatty acid amide of an aliphatic hydroxy non-tertiary amine, the fatty acid radical of which contains at least eight carbon atoms, said ingredients being present in proportions bearing a ratio to each other of from about 1 to 10 to about 10 to 1.

12. A cleansing composition comprising a cation-active quaternary ammonium compound corresponding to the general formula

wherein $R^1$ represents an aliphatic radical containing at least 8 carbon atoms, and $R^2$, $R^3$ and $R^4$ are members selected from the group consisting of hydrogen and hydrocarbon groups which may be components of a heterocyclic ring, in admixture with lauric acid amide of monoethanolamine, said ingredients being present in proportions bearing a ratio to each other of from about 1 to 10 to about 10 to 1.

13. A cleansing composition comprising an inorganic acid salt of a fatty acid ester of an hydroxy-alkyl non-tertiary amine, admixed with a carboxylic acid derivative of an aliphatic hydroxy compound, said fatty acid and carboxylic acid radicals each containing at least eight carbon atoms, said derivative containing at least one unesterified hydroxy group, said ingredients being present in proportions bearing a ratio to each other of from about 1 to 10 to about 10 to 1.

14. A cleansing composition comprising a hydrochloride of a fatty acid ester of monoethanolamine, admixed with a fatty acid derivative of an aliphatic hydroxy compound, said fatty acid radicals each containing at least eight carbon atoms, said derivative containing at least one unesterified hydroxy group, said ingredients being present in proportions bearing a ratio to each other of from about 1 to 10 to about 10 to 1.

15. A cleansing composition comprising a hydrochloride of the lauric acid ester of monoethanolamine and a fatty acid mono-ester of an aliphatic polyhydric alcohol, the fatty acid radical of which contains at least eight carbon atoms, said ingredients being present in proportions bearing a ratio to each other of from about 1 to 10 to about 10 to 1.

16. A cleansing composition comprising a hydrochloride of the lauric acid ester of monoethanolamine and a fatty acid amide of a hydroxy-alkyl nontertiary amine, the fatty acid radical of which contains at least eight carbon atoms, said ingredients being present in proportions bearing a ratio to each other of from about 1 to 10 to about 10 to 1.

17. A cleansing composition in the form of a solid cake comprising substantially equal parts, by weight, of a hydrochloride of the lauric acid ester of monoethanolamine and monolaurin.

18. A cleansing composition in the form of a solid cake comprising substantially equal parts, by weight, of the hydrochloride of the lauric acid ester of monoethanolamine and the lauric acid amide of monoethanolamine.

MORRIS KATZMAN.